(12) United States Patent
Yang et al.

(10) Patent No.: US 7,040,883 B2
(45) Date of Patent: May 9, 2006

(54) VANE SUPPORTING APPARATUS FOR HERMETIC COMPRESSOR

(75) Inventors: Kwang-Sik Yang, Changwon (KR); Hyoung-Joo Cho, Changwon (KR); Hong-Hee Park, Changwon (KR); Bum-Dong Sa, Changwon (KR)

(73) Assignee: LG Electronics Inc., Seoul (KR)

( * ) Notice: Subject to any disclaimer, the term of this patent is extended or adjusted under 35 U.S.C. 154(b) by 249 days.

(21) Appl. No.: 10/380,277

(22) PCT Filed: Nov. 19, 2002

(86) PCT No.: PCT/KR02/02159

§ 371 (c)(1),
(2), (4) Date: Mar. 12, 2003

(87) PCT Pub. No.: WO03/044370

PCT Pub. Date: May 30, 2003

(65) Prior Publication Data

US 2004/0022649 A1 Feb. 5, 2004

(30) Foreign Application Priority Data

Nov. 20, 2001 (KR) ............... 2001-72414
Dec. 4, 2001 (KR) ............... 2001-76306

(51) Int. Cl.
*F04C 18/00* (2006.01)
*F03C 2/00* (2006.01)

(52) U.S. Cl. ............ 418/248; 418/63; 418/216
(58) Field of Classification Search ......... 418/63, 418/216, 219, 248
See application file for complete search history.

(56) References Cited

U.S. PATENT DOCUMENTS 2,533,252 A * 12/1950 Hinckley ............ 418/248
5,868,559 A * 2/1999 Khetarpal ............ 418/248

FOREIGN PATENT DOCUMENTS

| DE | 832898 | * | 3/1952 | ............ 418/248 |
| JP | 57-59091 | * | 4/1982 | ............ 418/216 |
| JP | 58-41292 | * | 3/1983 | |

* cited by examiner

Primary Examiner—Theresa Trieu
(74) Attorney, Agent, or Firm—Fleshner & Kim, LLP (57) ABSTRACT

A vane supporting apparatus for a hermetic compressor elastically supports vanes contacting to both cam faces of a dividing plate with thin torsion coil springs, and forms curved surface portions on upper ends of the vanes where the torsion coil springs are contacted, and thereby, height of the supporting apparatus supporting the respective vanes is reduced to miniaturize the compressor, and also, to prevent contacted portions between the vanes and the torsion coil springs from being worn away.

19 Claims, 7 Drawing Sheets

VANE SUPPORTING APPARATUS FOR HERMETIC COMPRESSOR

TECHNICAL FIELD

The present invention relates to a vane supporting apparatus for a hermetic compressor, and particularly, to a vane supporting apparatus for a hermetic compressor which is capable of reducing length of the compressor in shaft direction by lowering a height.

BACKGROUND ART

Generally, a compressor using a vane divides an inner space of a cylinder into a suction area and a compression area by installing the vane to be contacted to a rotator body, changes the suction area and the compression area with each other successively according to phases of the rotating body when the rotating body is operated to suck, to compress, and to discharge fluid.

Figure 1:
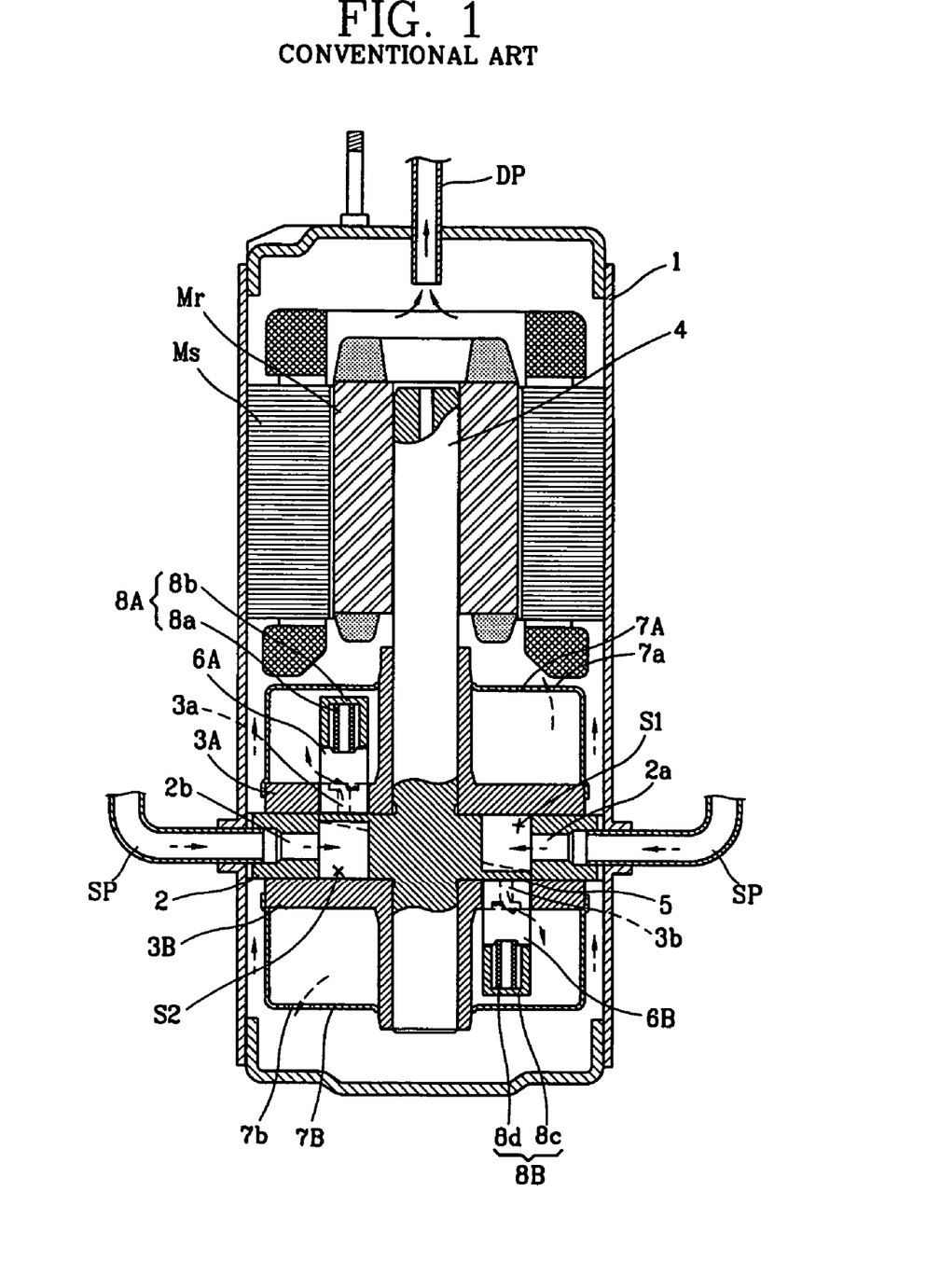
FIG. 1 is a longitudinal cross-sectional view showing an example of a conventional hermetic compressor.

FIG. 1 is a longitudinal cross-sectional view showing an example of a conventional hermetic compressor.

As shown therein, the conventional hermetic compressor comprises: a motor device unit consisting of a stator (Ms) and a rotor (Mr) for generating driving power on an inner upper portion of a casing 1, and a compression device unit connected to the rotor (Mr) for sucking, compressing and discharging the fluid.

The compression device unit comprises: a cylinder 2 fixed on a lower part of the casing 1; a first bearing plate 3A and a second bearing plate 3B fixed on an upper surface and on a lower surface of the cylinder 2 to form an inner space of the cylinder 2; a rotating shaft 4 coupled to the rotor (Mr) of the motor device unit and penetratingly coupled to the respective bearing plates 3A and 3B for transmitting the driving power of the motor device unit to the compression device unit; a dividing plate 5 coupled to the rotating shaft 4 or molded integrally with the rotating shaft 4 for dividing the inner space of the cylinder 2 into a first space (S1) and a second space (S2); a first vane 6A and a second vane 6B having lower ends and upper ends contacted to both surfaces of the dividing plate 5 respectively for dividing the respective spaces S1 and S2 into the suction area and the compression area when the rotating shaft 4 is rotated; and a first spring assembly 8A and a second spring assembly 8B for elastically supporting the respective vanes 6A and 6B.

The dividing plate 5 is formed as a disc when it is projected on a plane so that an outer circumferential surface thereof can be slidingly contacted to an inner circumferential surface of the cylinder 2, and both side surfaces of the dividing plate 5 are formed as cam faces of sine wave shape having same thickness from the inner circumferential surface to the outer circumferential surface when these are spread.

In addition, the first and second vanes 6A and 6B are formed as cuboids, penetrate the respective bearing plates 3A and 3B to be contacted to the lower and upper cam faces of the dividing plate 5 as described above, and reciprocate toward the shaft direction when the rotating shaft 4 is rotated. Outer side surfaces of the respective vanes 6A and 6B are contacted or inserted in the inner circumferential surface of the cylinder 2, however, inner side surfaces of the respective vanes 6A and 6B are coupled to be contacted to the outer circumferential surface of the rotating shaft 4 as slid.

Also, the first spring assembly 8A and the second spring assembly 8B comprise a first and a second supporting springs 8a and 8c made of coil compressive spring for supporting rear surfaces of the respective vanes 6A and 6B, and a first spring holder 8b and a second spring holder 8d for receiving the respective supporting springs 8a and 8c and mounted on the first bearing plate 3A and on the second bearing plate 3B.

In Figures, unexplained reference numerals 2a and 2b represent suction openings of the respective spaces S1 and S2, 3a and 3b represent discharge openings, 7A and 7B represent discharge mufflers, 7a and 7b are discharge holes, DP is a discharge pipe, and SP represents a suction pipe.

Hereinafter, operations of the conventional hermetic compressor as above will be described.

When electric power is applied to the motor device unit to rotate the rotor (Mr), the rotating shaft 4 coupled to the rotor (Mr) is rotated to one direction with the dividing plate 5, and the vanes 6A and 6B contacted to upper and lower side surfaces of the dividing plate 5 reciprocate to opposite directions of each other according to the height (phase) of the dividing plate 5 to vary volumes of the first and second spaces S1 and S2. And new fluid is sucked simultaneously through the suction openings 2a and 2b of the first and second spaces S1 and S2, then compressed, and after that, the compressed fluid is discharged through the discharge openings 3a and 3b of the respective spaces S1 and S2 as soon as a top dead center or a bottom dead center of the dividing plate 5 reaches to a discharge starting point.

Figure 2:
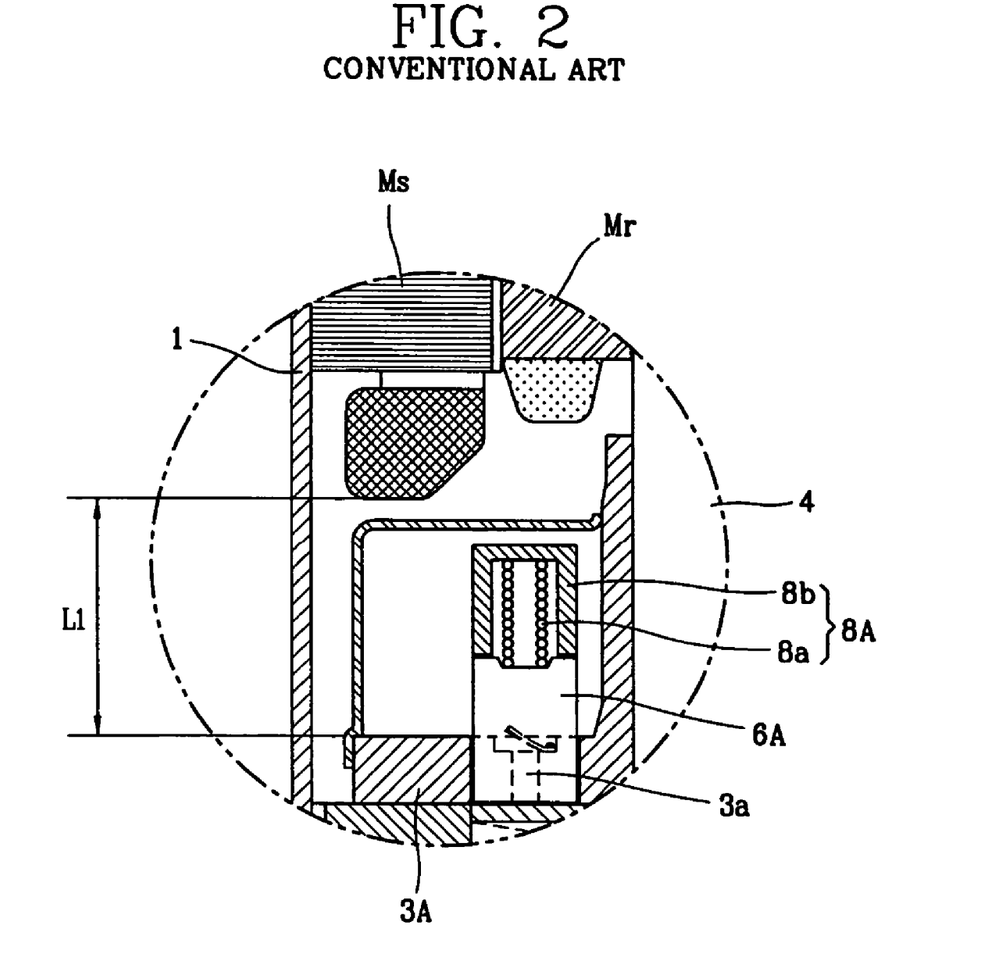
FIG. 2 is a longitudinal cross-sectional view showing a vane supporting apparatus for the conventional hermetic compressor.

However, in the conventional compressor as above, the first and second supporting springs 8a and 8c supporting the respective vanes 6A and 6B are made of coil compressive springs having predetermined lengths in shaft direction, and therefore, a predetermined distance (L1) should be maintained between the first supporting spring 8a and the coil of the stator (Ms) as shown in FIG. 2. Therefore, the length of the compressor in shaft direction is increased.

DISCLOSURE OF THE INVENTION

Therefore, it is an object of the present invention to provide a vane supporting apparatus for a hermetic compressor which is able to miniaturize a size of the compressor by decreasing a height of supporting members supporting respective vanes.

To achieve these objects, there is provided a vane supporting apparatus for a hermetic compressor, which comprises a sealed casing, a motor device unit fixedly coupled to an inner upper part of the casing for generating a driving power, a cylinder fixedly coupled to a lower part of the casing, a first bearing plate and a second bearing plate fixed on upper and lower surfaces of the cylinder for forming an inner space of the cylinder together, a rotating shaft coupled to a rotor of the motor device unit and penetrating the respective bearing plates, a dividing plate coupled to the rotating shaft in the inner space of the cylinder for dividing the inner space into a plurality of sealed spaces, and a plurality of vanes reciprocating along with the axial line direction as contacted to both surfaces of the dividing plate when the rotating shaft is rotated for converting the respective sealed spaces into a suction area and a compression area, comprising: at least one or more torsion coil springs having one end contacted to the bearing plates, the other end contacted to the respective vanes, and an intermediate part forming a winding portion to elastically support the respective vanes; and at least one or more supporting members coupled to one outer side surface of the first and second bearing plates so that the respective torsion coil springs can be fixedly supported by one side of the first and second bearing plates.

MODES FOR CARRYING OUT THE PREFERRED EMBODIMENTS

Hereinafter, a vane supporting apparatus for a hermetic compressor according to the present invention will be described with reference to embodiments shown in accompanying Figures.

Figure 3:
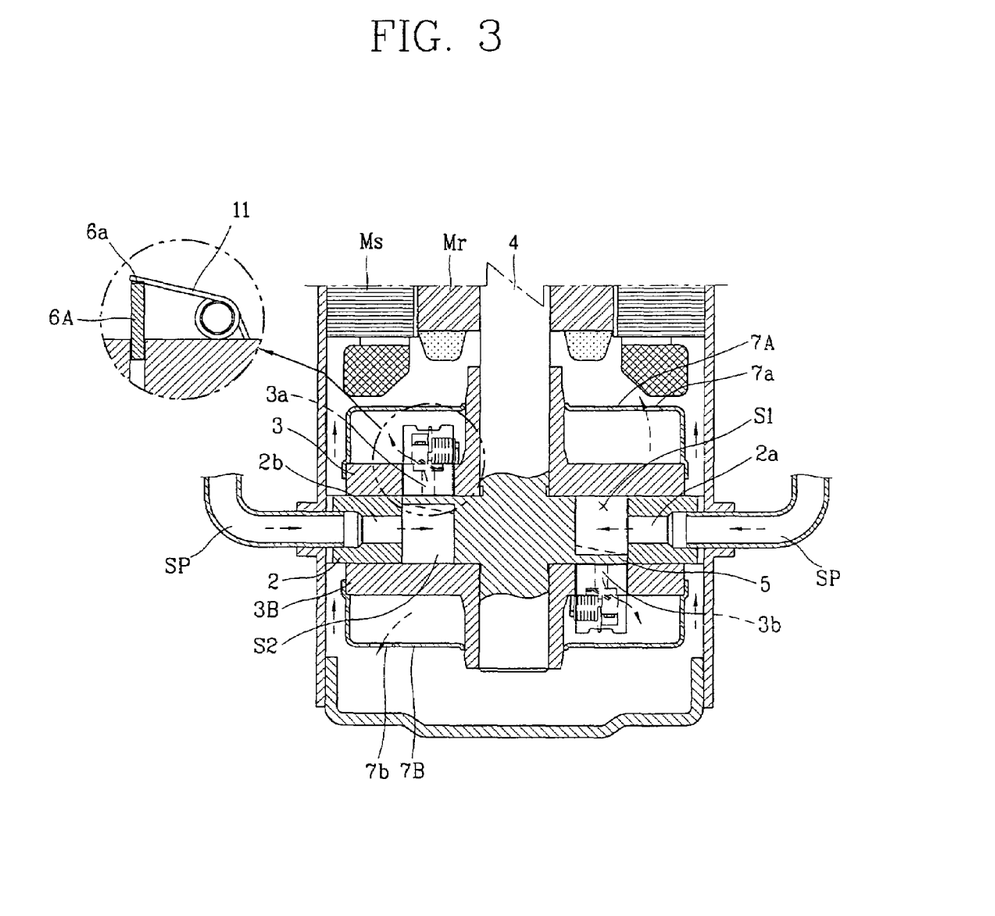
FIG. 3 is a longitudinal cross-sectional view showing an embodiment of a hermetic compressor according to the present invention.
Figure 4:
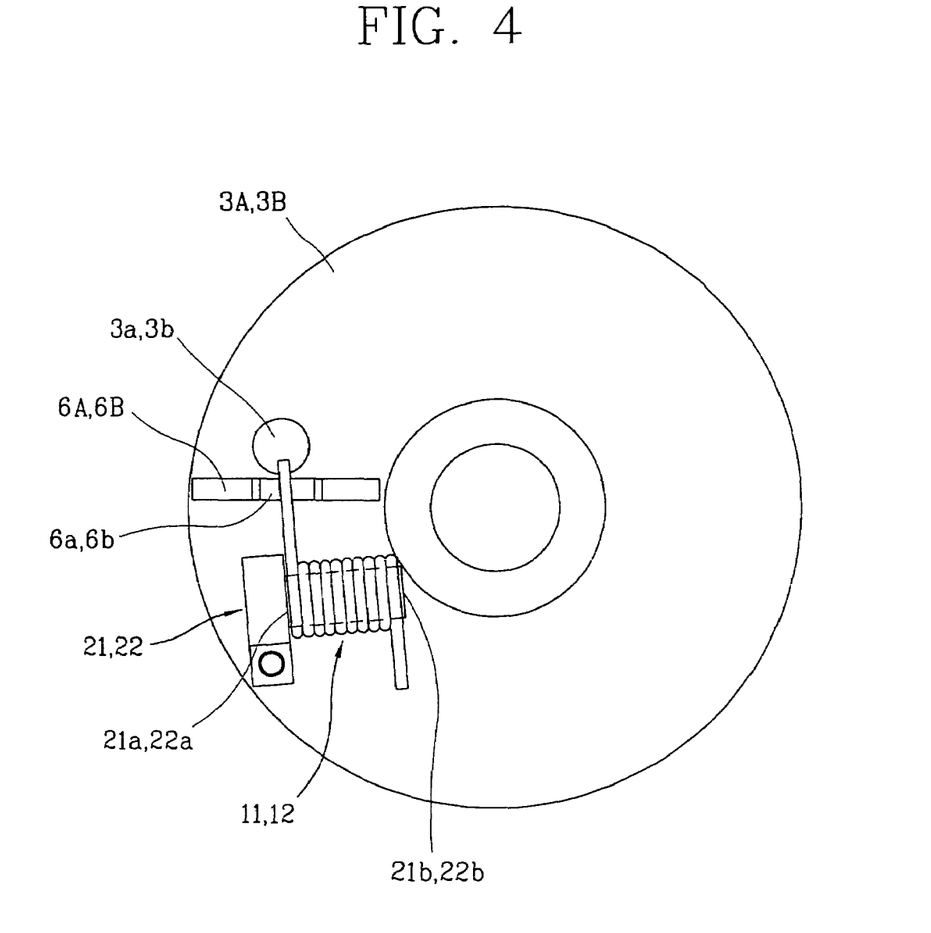
FIG. 4 is a plane view showing a vane supporting apparatus for the hermetic compressor according to the present invention.
Figure 5:
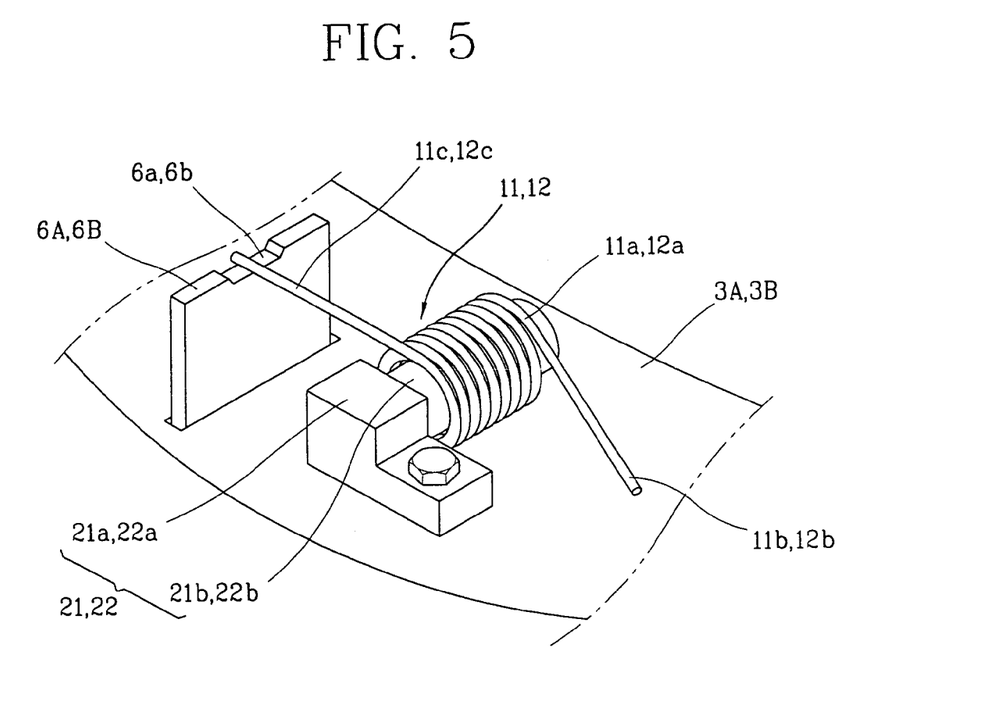
FIG. 5 is a perspective view showing the vane supporting apparatus for the hermetic compressor according to the present invention.
Figure 6:
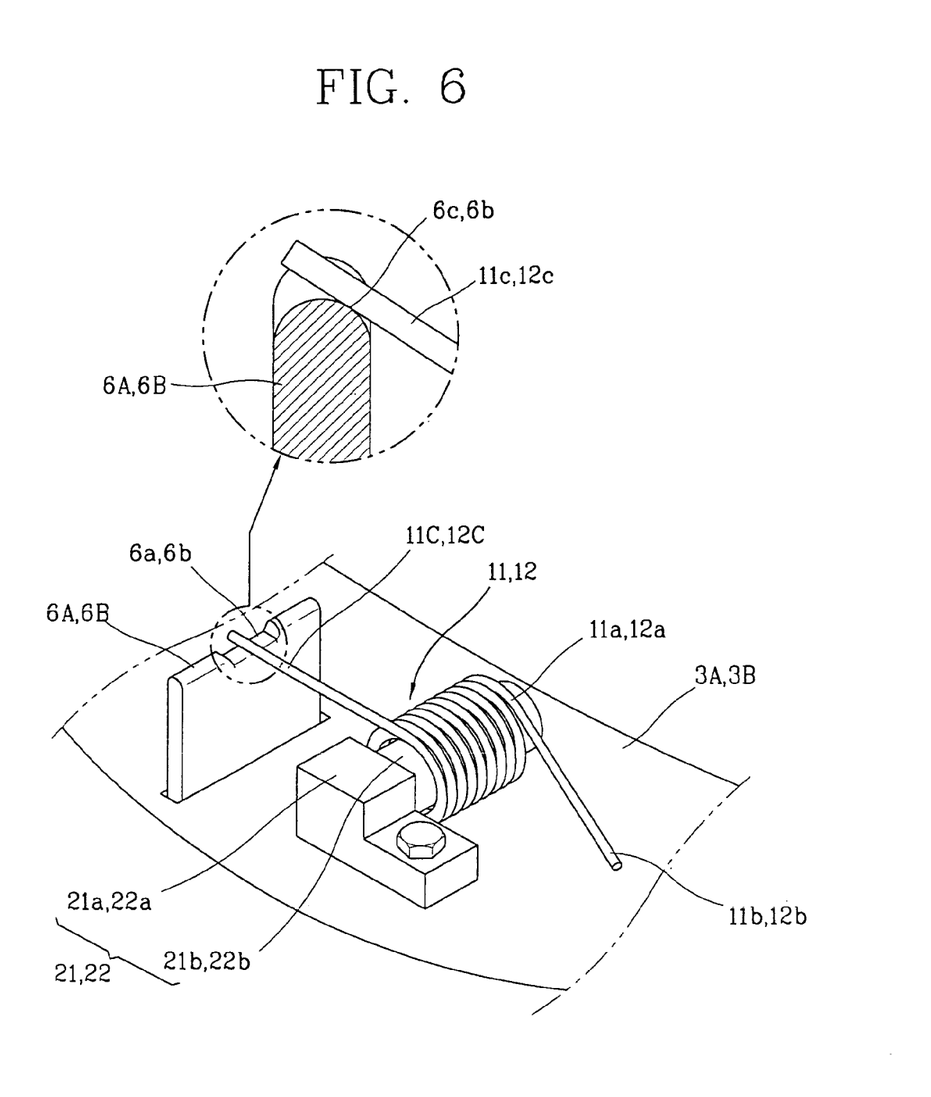
FIG. 6 is a perspective view showing another embodiment of the vane supporting apparatus for the hermetic compressor according to the present invention.

FIG. 3 is a longitudinal cross-sectional view showing an embodiment of the hermetic compressor according to the present invention, FIGS. 4 and 5 are a plane view and a perspective view showing the vane supporting apparatus for the hermetic compressor according to the present invention, and FIG. 6 is a longitudinal cross-sectional view showing the vane supporting apparatus for the hermetic compressor according to the present invention.

As shown therein, the compressor including the vane supporting apparatus according to the present invention comprises a stator (Ms) and a rotor (Mr) fixed on inner upper part of a casing 1 for making a motor device unit, a cylinder 2 fixedly coupled to a lower part of the casing 1, a first bearing plate 3A and a second bearing plate 3B fixed on upper and lower surface of the cylinder for forming an inner space of the cylinder 2 together, a rotating shaft 4 coupled to the rotor (Mr) and penetrating the respective bearing plates 3A and 3B simultaneously, a dividing plate 5 coupled to the rotating shaft 4 or molded integrally with the rotating shaft 4 for dividing the inner space of the cylinder 2 into a first space S1 and a second space S2, a first vane 6A and a second vane 6B of which a lower end and an upper end are contacted to both surfaces of the dividing plate 5 to divide the respective spaces S1 and S2 into a suction area and a compression area when the rotating shaft 4 is rotated, a first torsion coil spring 11 and a second torsion coil spring 12 for elastically supporting the respective vanes 6A and 6B, and at least one or more supporting members 21 and 22 coupled to one outer side surfaces of the first bearing plate 3A and the second bearing plate 3B so that the respective torsion coil springs 11 and 12 can be fixedly supported on one sides of the first bearing plate 3A and the second bearing plate 3B.

The dividing plate 5 is formed as a disc when it is projected on a plane so that an outer circumferential surface of the dividing plate 5 is contacted to the inner circumferential surface of the cylinder 2 as slid, and both side surfaces of the dividing plate 5 are formed as cam faces of sine wave shape having same thickness from the inner circumferential surface to the outer circumferential surface when the side surface is spread.

In addition, the first vane 6A and the second vane 6B are formed as cuboids roughly, one ends penetrate the respective bearing plates 3A and 3B and contacted to upper and lower cam faces of the dividing plate 5. In addition, spring recesses 6a and 6b on which one end of the first torsion coil spring 11 and one end of the second torsion coil spring 12 are mounted are formed on centers of the other ends of the vanes which are not contacted to the cam faces of the dividing plate 5.

On the other hand, the first torsion coil spring 11 and the second torsion coil spring 12 comprise winding portions 11a and 12a on center parts thereof to make elastic portions, rest portions 11b and 12b constructing one end of the winding portions 11a and 12a and mounted on upper surfaces of the respective bearing plates 3A and 3B for supporting, and supporting portions 11c and 12c constructing the other ends of the winding portions 11a and 12a and mounted on the spring recesses 6a and 6b of the respective vanes 6A and 6B to be supported.

In addition, as shown in FIG. 5, the first supporting member 21 and the second supporting member 22 are formed to have cross sections of "L" shape, and comprise supporting bodies 21a and 22a fixed on the respective bearing plates 3A and 3B using a bolt or in welding method, and supporting protrusions 21b and 22b, in which the winding portions 11a and 12a of the respective torsion coil springs 11 and 12 are inserted and fixed, formed protrusively on vertical surfaces of the supporting bodies 21a and 22a.

On the other hand, as shown in FIG. 6, the supporting apparatus may comprise curved surface portions 6c and 6d on bottom surfaces or on both side surfaces of the spring recesses 6a and 6b in order to prevent the bottom surface or the both side surfaces of the spring recesses 6a and 6b contacting to the respective torsion coil springs 11 and 12 from being worn away due to repeated contacting to the vanes 6A and 6B or to the supporting portions 11c and 12c of the torsion coil springs 11 and 12 as another embodiment of the vane supporting apparatus for the hermetic compressor according to the present invention.

Figure 7:
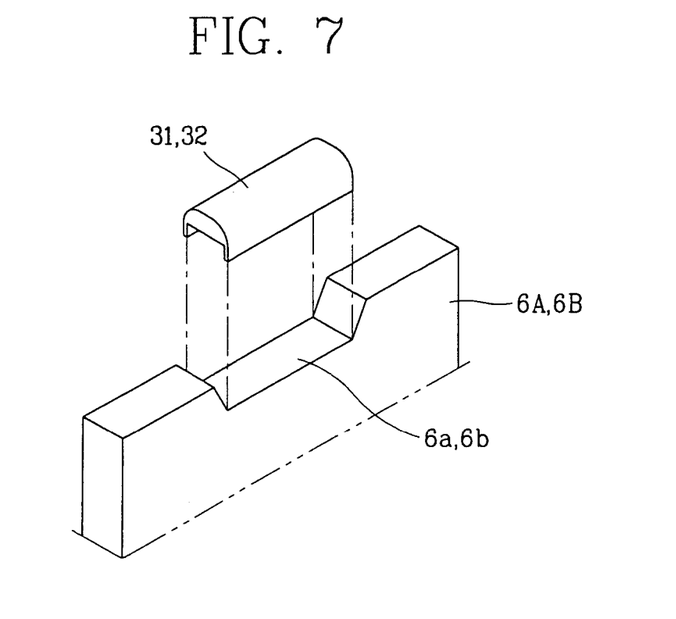
FIG. 7 is a perspective view showing still another embodiment of the vane supporting apparatus for the hermetic compressor according to the present invention.

Also, as shown in FIG. 7, the supporting apparatus may be formed by forming the spring recesses 6a and 6b on upper parts of the respective vanes 6A and 6B and by forcedly inserting lubricating members 31 and 32 made of a predetermined material into the spring recesses 6a and 6b as another embodiment of the vane supporting apparatus for the hermetic compressor according to the present invention.

In above case, the additional curved surface portions 6c and 6d are not formed on the respective vanes 6A and 6B, and accordingly, the vanes 6A and 6B are formed in a relatively easy way.

In Figures, unexplained reference numerals 2a and 2b represent suction openings of respective spaces, 3a and 3b represent discharge openings, 7A and 7B are discharge mufflers, 7a and 7b are discharge holes, DP is discharge pipe, and SP represents suction pipe.

Hereinafter, operations and effects of the vane supporting apparatus for the hermetic compressor according to the present invention.

When electric power is applied to the motor device unit, the rotating shaft 4 is rotated with the dividing plate 5, and therefore, the vanes 6A and 6B which are contacted to upper and lower side surfaces of the dividing plate 5 are undergone the reciprocating movements in up-and-down direction along with the height of the dividing plate toward opposite directions with each other. In above process, new fluid is sucked into the first space S1 and into the second space S2 of the cylinder 2 simultaneously, compressed gradually, and discharged sequentially at that time when a top dead center or bottom dead center of the dividing plate 5 reaches to a discharge starting point, and the processes are repeated.

At that time, the respective torsion coil springs 11 and 12 accumulates twisting moment centering around the supporting protrusive portions 21b and 22b of the supporting members 21 and 22 until the dividing plate 5 reaches to the top dead center or to the bottom dead center, and pushes the vanes 6A and 6B so as to be adhered to the respective cam faces of the dividing plate 5, and thereby, the sealed spaces of the first space S1 and the second space S2 can be maintained.

Figure 8:
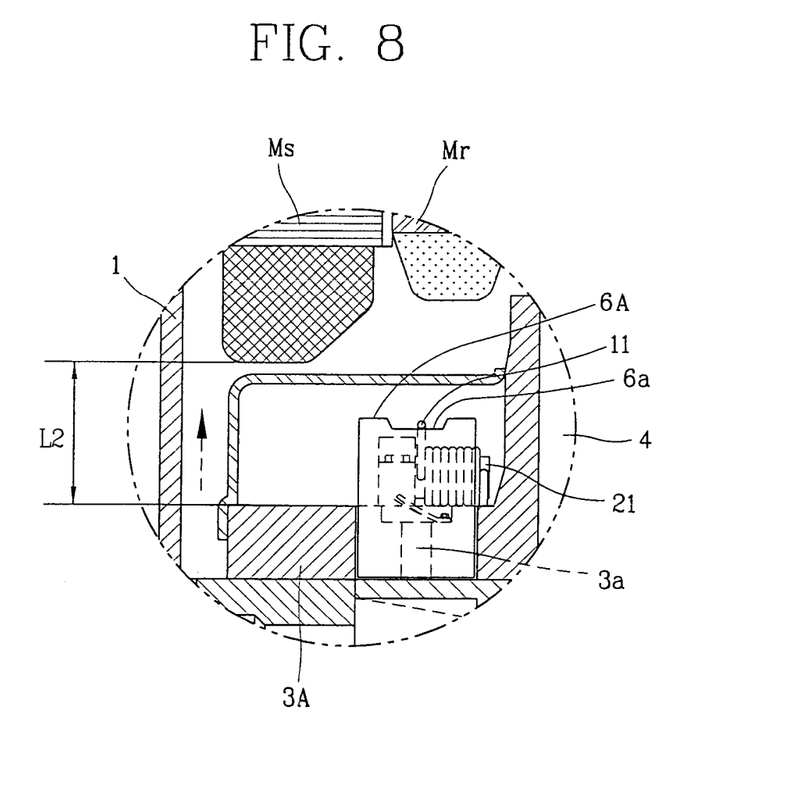
FIG. 8 is a longitudinal cross-sectional view describing operations and effects of the vane supporting apparatus for the hermetic compressor according to the present invention.

The vanes 6A and 6B are elastically supported using the first torsion coil spring 11 and the second torsion coil spring 12, and thereby, the height of the supporting apparatus for supporting the respective vanes 6A and 6B can be reduced. Accordingly, the distance L2 between the motor device unit and the compression device unit can be reduced as shown in FIG. 8, and consequently, the entire length of the compressor can be shortened.

Also, the spring recesses 6a and 6b are formed on the upper ends of the respective vanes 6A and 6B to prevent the respective torsion coil springs 11 and 12 from being slid away to left and right sides in advance when the torsion coil springs 11 and 12 rotate upward and downward with the respective vanes 6A and 6B, and the curved surface portions 6c and 6d are formed on the bottom surface and on left and light side edges of the spring recesses 6a and 6b contacting to the torsion coil springs 11 and 12 to prevent the vanes 6A and 6B or the torsion coil springs 11 and 12 from being worn away in advance.

As described above, in the vane supporting apparatus for the hermetic compressor according to the present invention, the vanes contacting to the both cam faces of the dividing plate are elastically supported by thin torsion coil springs, and the curved surface portions are formed on the upper ends of the vanes where the respective torsion springs are contacted, and thereby, the height of the supporting apparatus supporting the respective vanes can be reduced to reduce the length of the compressor in the shaft direction, and also, to prevent the contacted portion of the vane and the torsion coil spring from being worn away.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

The invention claimed is:

1. A vane supporting apparatus for a hermetic compressor, the hermetic compressor comprising a sealed casing, a motor device unit coupled on an inner upper part of the casing and configured to generate driving power, a cylinder fixedly coupled to a lower part of the casing, a first bearing plate and a second bearing plate fixed on upper and lower surfaces of the cylinder so as to form an inner space of the cylinder together with the cylinder, a rotating shaft coupled to a rotor of the motor device unit and penetrating the respective bearing plates, a dividing plate coupled to the rotating shaft in the inner space of the cylinder for dividing the inner space into a plurality of sealed spaces, and a plurality of vanes reciprocating along an axial line direction and contacted to both surfaces of the dividing plate when the rotating shaft is rotated so as to convert the respective sealed spaces into a suction area and a compression area, the vane supporting apparatus comprising:

at least one torsion coil spring having one end contacted to one of the respective bearing plates, the other end contacted to one of the respective vanes, and an intermediate part formed of a winding portion configured to elastically support the respective vane; and at least one supporting member coupled to an outer side surface of the respective bearing plate so that the at least one torsion coil spring is fixedly supported by the respective outer side surface of the respective bearing plate, wherein the winding portion of the at least one torsion coil spring is inserted onto and supported by a supporting protrusive portion that extends from the at least one supporting member.

2. The apparatus of claim 1, wherein a respective spring recess, in which one end of the torsion coil spring is supported, is formed concavely on an upper portion of the respective vane.

3. The apparatus of claim 2, wherein the respective spring recess includes a curved surface portion at a side edge thereof.

4. The apparatus of claim 1, further comprising a lubricating member fixedly coupled to an end of the respective vane to which the at least one torsion coil spring is contacted.

5. The apparatus of claim 4, wherein the respective lubricating member is inserted into and affixed to a respective spring recess concavely formed on an upper portion of the respective vane.

6. A vane hermetic compressor comprising the vane supporting apparatus of claim 1.

7. A vane supporting apparatus for a hermetic compressor, the hermetic compressor comprising a sealed casing, a motor device unit coupled on an inner upper part of the casing and configured to generate driving power, a cylinder fixedly coupled to a lower part of the casing, a first bearing plate and a second bearing plate fixed on upper and lower surfaces of the cylinder so as to form an inner space of the cylinder together with the cylinder, a rotating shaft coupled to a rotor of the motor device unit and penetrating the respective bearing plates, a dividing plate coupled to the rotating shaft in the inner space of the cylinder for dividing the inner space into a plurality of sealed spaces, and a plurality of vanes reciprocating along an axial line direction and contacted to both surfaces of the dividing plate when the rotating shaft is rotated so as to convert the respective sealed spaces into a suction area and a compression area, the vane supporting apparatus comprising:

at least one torsion coil spring having one end contacted to one of the respective bearing plates, the other end contacted to one of the respective vanes, and an intermediate part formed of a winding portion configured to elastically support the respective vane; and at least one supporting member coupled to an outer side surface of the respective bearing plate so that the at least one torsion coil spring is fixedly supported by the respective outer side surface of the respective bearing plate, wherein a respective spring recess, in which one end of the torsion coil spring is supported, is formed concavely on an upper portion of the respective vanes and wherein the respective spring recess includes a curved surface portion at a side edge thereof.

8. The apparatus of claim 7, wherein the winding portion of the at least one torsion coil spring is inserted onto a supporting protrusive portion that extends from the respective supporting member.

9. The apparatus of claim 7, wherein the winding portion of the at least one torsion coil spring is inserted onto a supporting protrusive portion that extends from the at least one supporting member.

10. The apparatus of claim 7, wherein a spring recess, in which one end of the torsion coil spring is supported, is formed concavely on an upper portion of the respective vane.

11. The apparatus of claim 10, wherein the respective spring recess includes a curved surface portion at a side edge thereof.

12. The apparatus of claim 7, further comprising a lubricating member fixedly coupled to an end of the respective vane to which the at least one torsion coil spring is contacted.

13. The apparatus of claim 12, wherein the respective lubricating member is inserted into and affixed to a respective spring recess concavely formed on an upper portion of the respective vane.

14. A hermetic compressor comprising the vane supporting apparatus of claim 7.

15. A vane supporting apparatus for a hermetic compressor, the hermetic compressor comprising a sealed casing, a motor device unit coupled on an inner upper part of the casing and configured to generate driving power, a cylinder fixedly coupled to a lower part of the casing, a first bearing plate and a second bearing plate fixed on upper and lower surfaces of the cylinder so as to form an inner space of the cylinder together with the cylinder, a rotating shaft coupled to a rotor of the motor device unit and penetrating the respective bearing plates, a dividing plate coupled to the rotating shaft in the inner space of the cylinder for dividing the inner space into a plurality of sealed spaces, and a plurality of vanes reciprocating along an axial line direction and contacted to both surfaces of the dividing plate when the rotating shaft is rotated so as to convert the respective sealed spaces into a suction area and a compression area, the vane supporting apparatus comprising:

at least one torsion coil spring having one contacted to one of the respective bearing plates, the other contacted to one of the respective vanes, and an intermediate part formed of a winding portion configured to elastically support the respective vane;

at least one supporting member coupled to an outer side surface of the respective bearing plate so that the at least one torsion coil spring is fixedly supported by the respective outer side surface of the respective bearing plate; and a lubricating member fixedly coupled to an end of the respective vane to which the at least one torsion coil spring is contacted.

16. The apparatus of claim 15, wherein the respective lubricating member is inserted into and affixed to a respective spring recess concavely formed on an upper portion of the respective vane.

17. The apparatus of claim 15, wherein a respective spring recess, in which one end of the torsion coil spring is supported, is formed concavely on an upper portion of one of the respective vanes.

18. The apparatus of claim 17, wherein the respective spring recess includes a curved surface portion at a side edge thereof.

19. A hermetic compressor comprising the vane supporting apparatus of claim 15.

* * * * *